United States Patent
van Wijk (10) Patent No.: US 6,750,765 B1
(45) Date of Patent: Jun. 15, 2004

(54) TRACING OF TRANSPONDER-TAGGED OBJECTS

(75) Inventor: Wouter Uco van Wijk, Maartensdijk (NL)

(73) Assignee: Cross Point RFAPP B.V., Emmen (NL)

( * ) Notice: Subject to any disclaimer, the term of this patent is extended or adjusted under 35 U.S.C. 154(b) by 21 days.

(21) Appl. No.: 10/307,814

(22) Filed: Dec. 2, 2002

(30) Foreign Application Priority Data

Nov. 26, 2001 (EP) .............................. 01204632

(51) Int. Cl.$^7$ ................................ G08B 26/00
(52) U.S. Cl. ............... 340/505; 340/539.1; 340/539.13; 340/572.1; 340/10.1
(58) Field of Search ............... 340/505, 539.1, 340/539.12–539.13, 539.23–572.1, 10.1, 286.07

(56) References Cited

U.S. PATENT DOCUMENTS

| | | | |
|---|---|---|---|
| 5,014,040 A | 5/1991 | Weaver et al. |
| 6,057,756 A | 5/2000 | Engellenner |
| 6,137,414 A | 10/2000 | Federman |
| 6,150,921 A | 11/2000 | Werb et al. |
| 6,211,781 B1 | 4/2001 | McDonald |
| 6,424,838 B1 | 7/2002 | Stobbe et al. |

FOREIGN PATENT DOCUMENTS

| | | |
|---|---|---|
| EP | 0 467 036 A2 | 1/1992 |
| EP | 0 613 108 A1 | 8/1994 |
| EP | 0 689 150 | 12/1995 |
| EP | 0 944 014 A2 | 3/1998 |
| EP | 0 965 857 A2 | 6/1998 |
| GB | 2 298 098 A | 8/1996 |
| GB | 2 353 910 A | 3/2001 |
| WO | 95/01014 | 1/1995 |
| WO | 96/36932 | 11/1996 |
| WO | 99/23623 | 5/1999 |
| WO | 99/62039 | 12/1999 |
| WO | 99/67737 | 12/1999 |
| WO | 00/16564 | 3/2000 |
| WO | 00/77536 A2 | 12/2000 |
| WO | 01/06444 A1 | 1/2001 |

*Primary Examiner*—Daryl Pope
(74) *Attorney, Agent, or Firm*—Pearne & Gordon LLP (57) ABSTRACT

For tracing objects distributed transmitter stations are provided, each transmitting an activation signal. Tags are attached to objects. The tags receive the activation signals when in an operating area of one of the transmitter stations. The received activation signal causes the tag to transmit a reaction signal. A receiver station receives the reaction signals. Data representing positions of tags in accordance with the received reaction signals are registered. The activation signals each also include a transmitter station code associated to the transmitter station transmitting that signal. The transmitter station codes transmitted by different transmitter stations are mutually different. The reaction signals transmitted by the tags each include the transmitter station code included in the received activation signal that caused the tag to transmit that reaction signal. Data representing positions of tags are registered in accordance with transmitter station codes received from the tags by the receiver station.

19 Claims, 2 Drawing Sheets

| TAG | ACTIVATOR |
|-----|-----------|
| 001 | ANY |
| 002 | 003 |
| 003 | ANY |
| 004 | 003 |
| ----- | ----- |

Fig. 4

TRACING OF TRANSPONDER-TAGGED OBJECTS

FIELD AND BACKGROUND OF THE INVENTION

The invention relates to a method for tracing objects, to a system for tracing objects, to a tag for a system for tracing objects, to a transmitter station for a system for tracing objects and to a computer program for use in a system for tracing objects.

BACKGROUND OF THE INVENTION

A method, a system, a tag, a transmitter station and a computer program for tracing objects are described in United States patent 6 057 756. According to this patent a set of receiver stations is used which receive reaction signals from the tags. The transmitters and receivers are coupled to a controller by a transmitter bus and a receiver bus. The controller is typically activated by a request for an item and causes an interrogation signal to be transmitted by at least one of the transmitters. Various tagged objects will be subjected to the interrogation signal, but only one object—the one requested by the user—will respond to the interrogation signal. The interrogation signal triggers the tag matching the interrogation signal to send a responsive signal, which signal is detected by the nearest one of the receiver stations and the location of the object can then be reported.

European patent application 0 467 036 describes a system in which the transmitter and the receiver are combined in interrogator stations. It is described to determine the approximate location of tags by identifying the location of the interrogator, which has received the responsive signal from the tag.

Other examples in which the approximate location of tags is determined in accordance with the positions of receivers are described in international patent applications WO 98/16849, WO/99123623, WO 99/62039, WO 99/67737, WO 00/16564. A disadvantage of these known methods and systems is that each of the interrogators needs to communicate individually with the controller.

A similar disadvantage also applies to the system described in UK patent application 2 298 098 according to which a plurality of slave stations receive signals from a transponder and the position of the transponder is determined from the time delays with which signals from the transponder are received by the slave stations.

In European patent application 0 965 857 a system for determining the position of a tag, with particular accuracy in the area of an entrance is described. According to this document, an angular difference of preferably 180° between the phases of the field of a cell in which the transponder is detected and of the fields of neighbouring overlapping cells is provided, so that the transponder can detect and signal to a receiver that it is in de area of the overlap and the direction in which the transponder is moving can be determined from the phase change occurring when passing from one field into the overlap and from the overlap into the other field. This allows detection of the position and direction of motion of a transponder in the area of for instance a gate at the exit of a building with an accuracy of a few centimetres, which, in turn, allows early and reliable warning that a transponder is brought outside the building. However, the transmitters need to be able to communicate individually with the control unit to be able to change the phase of the field generated thereby in response to detection of a transponder in a neighbouring field.

In UK patent application 2 353 910, an asset tracking system is described in which a beacon transmits a signal including an ID signal. An asset decodes the signal to determine the ID signal and sends the beacon ID to a central server. It is further described that this transmission may be over any communications network, for example a LAN or a telephone network, or a wireless network comprising a relay system through the beacons themselves. The server computes the physical location from the beacon ID, or the server detects a change of location of the asset determined from a list of beacons and a list of asset locations held by the server. Bluetooth digital radio technology is described as the preferred implementation. A problem of this system is that a network is required to communicate the signals from the asset to the central server.

SUMMARY OF THE INVENTION

It is an object of the invention to facilitate tracing of objects (which may also includes human persons or animals), in particular by providing a solution requiring relatively little installation effort.

According to the present invention, this object is achieved by providing a method for tracing objects, comprising:

providing a plurality of distributed transmitter stations, each of said transmitter stations transmitting an activation signal;

attaching a tag to each object to be monitored, each of said tags receiving the activation signal from one of said transmitter stations when in an operating area of said one of said transmitter stations, the received activation signal causing the tag to transmit a reaction signal and the operating areas of said transmitter stations being spatially distributed;

providing at least one receiver station, said receiver station receiving said reaction signals transmitted by said tags; and registering data representing positions of tags in accordance with said reaction signals received by said at least one receiver station;

wherein the activation signal transmitted by each of said transmitter stations includes a predetermined transmitter station code associated to that transmitter station, the transmitter station codes transmitted by at least two of said transmitter stations being mutually different and distinguishing activation signals from at least one of said transmitter stations from activation signals from at least one other one of said transmitter stations;

said reaction signals transmitted by activated ones of said tags each including the transmitter station code included in the received activation signal that caused the tag to transmit said reaction signal; and the registration of data representing positions of tags being carried out in accordance with different transmitter station codes received from said tags by said receiver station or each of said receiver stations.

The invention can also be embodied in a system specifically adapted for use in such a method, which system, includes:

a plurality of distributed transmitter stations for transmitting activation signals;

a plurality of tags for attachment to objects to be monitored, each of said tags including a receiver for receiving the activation signal from one of said transmitter stations when in the operating area of said one of said transmitter stations and a transmitter communicating with the receiver for activation of the transmitter to transmit a reaction signal in response to receipt of an activation signal by the receiver, the operating areas of said transmitter stations being spatially distributed;

at least one receiver station for receiving said reaction signals transmitted by said tags; and a data registration structure communicating with said at least one receiver station for registering data representing positions of tags in accordance with said reaction signals received by said at least one receiver station;

wherein said transmitter stations are each adapted for including a predetermined transmitter station code in the activation signal, the transmitter station codes of at least two of said transmitter stations being mutually different and mutually distinguishing activation signals from at least one of said transmitter stations from activation signals from at least one other one of said transmitter stations;

said tags each being adapted for receiving transmitter station codes in the received activation signal and for including the transmitter station code of the activation signal that caused the reaction signal to be transmitted in the reaction signal transmitted by that tag; and said data registration structure being adapted for registration of data representing different positions of activated ones of tags in accordance with different transmitter station codes received from said tags by said receiver station or each of said receiver stations.

The invention can also be embodied in a computer program, that may be provided in machine readable form as a signal or on a data carrier, for controlling a particular embodiment of the method according to the invention in which warning signals are selectively not generated in response to authorized combinations of codes received from the tags. According to the invention this object is achieved with a computer program including:

instructions for causing a data registration structure to read reaction signals inputted from a receiver station and to register data representing positions of tags in accordance with said inputted reaction signals;

instructions for reading transmitter station codes included in said inputted reaction signals and instructions for registering data representing positions of tags in accordance with transmitter station codes included in said inputted reaction signals;

instructions for comparing inputted reaction signals with a predetermined warning condition, instructions for generating a warning signal if the inputted reaction signal matches the predetermined warning condition, and instructions for causing said comparing and generating instructions to be carried out in real-time;

instructions for registering data representing positions of personal tags in accordance with inputted reaction signals including the transmitter station code included in the received activation signal that caused the reaction signal to be transmitted;

instructions for combining said data representing positions of personal tags with data representing positions of tags that have been received by the receiver station in a common period of time; and instructions causing said warning signal not to be generated or to be generated in modified form in response to data representing a combination of a reaction signal matching a warning condition and a reaction signal including a predetermined personal tag code and including the same transmitter station code as the transmitter station code included in the reaction code matching the warning condition.

Further objects, features, effects and details of the invention are set forth in the description of exemplary embodiments of the invention.

DETAILED DESCRIPTION

The invention is first described with reference to FIG. 1 in which an installed example of a system for tracing objects as proposed is shown. For the sake of clarity and conciseness of the description, the described example is a quite small system although system as proposed are very suitable for larger applications in which objects in a far larger area are traced.

Figure 1:
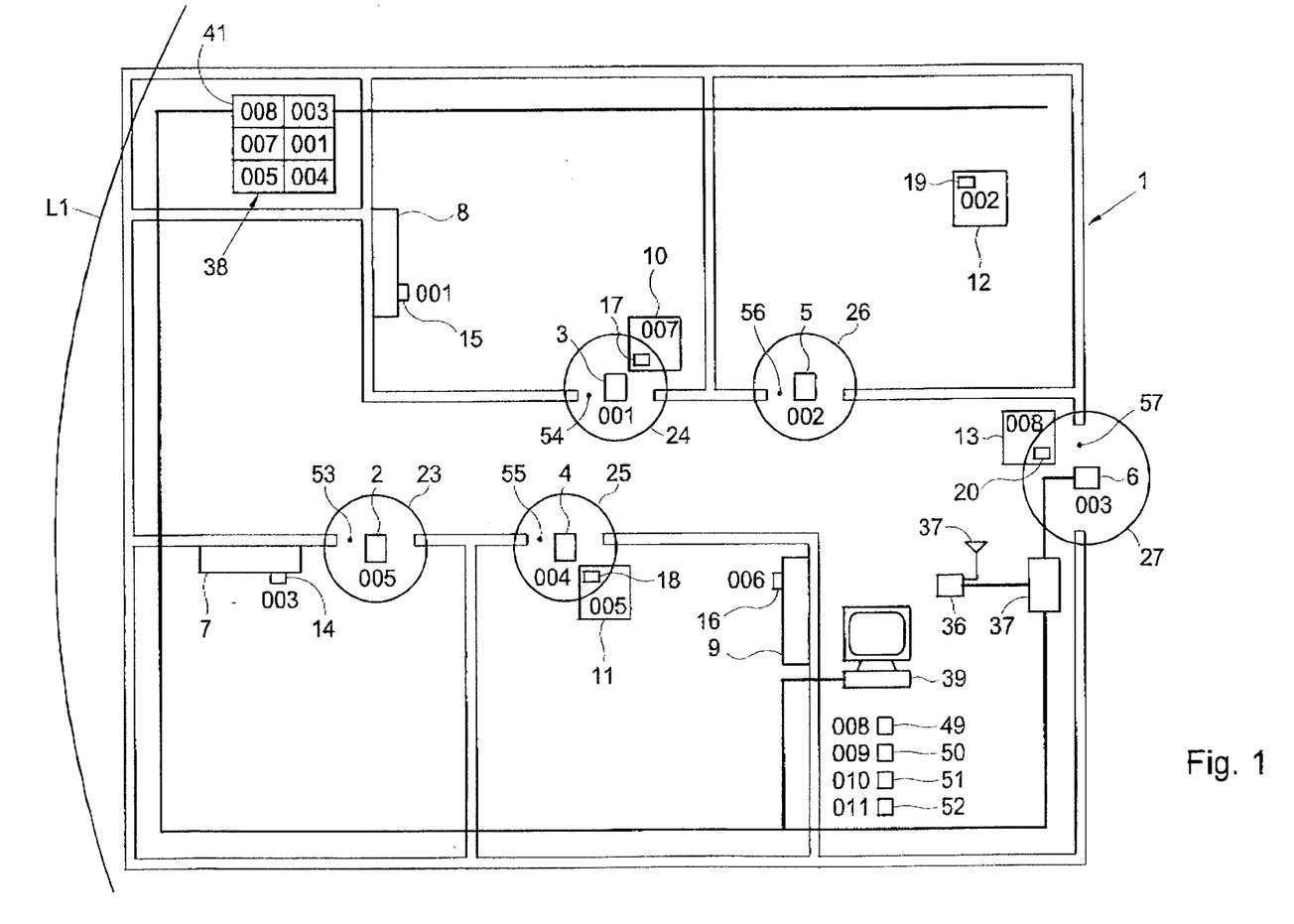
FIG. 1 is a schematic representation in top plan view of an example of an installed system according to the invention.

FIG. 1 shows a floor plan of a building 1 which may for instance be an office, a centre for medical care or a school. In this example the building consists of only one floor, but the system can also be applied to multi-storey buildings.

The system includes a number of transmitter stations 2–6 for transmitting activation signals. The transmitter stations 2–6 are located at distributed positions throughout the building 1.

In the building 1 a number of objects are present of which the location is to be monitored. These include normally stationary objects 7–9 for instance paintings, stationary CRT displays, projectors etc. and objects 10–13 which are moved regularly, such as notebook computers, portable projectors, portable medical instruments, trolleys etc. To each of these objects 7–13, a transponder tag 14–20 is attached.

Figure 2:
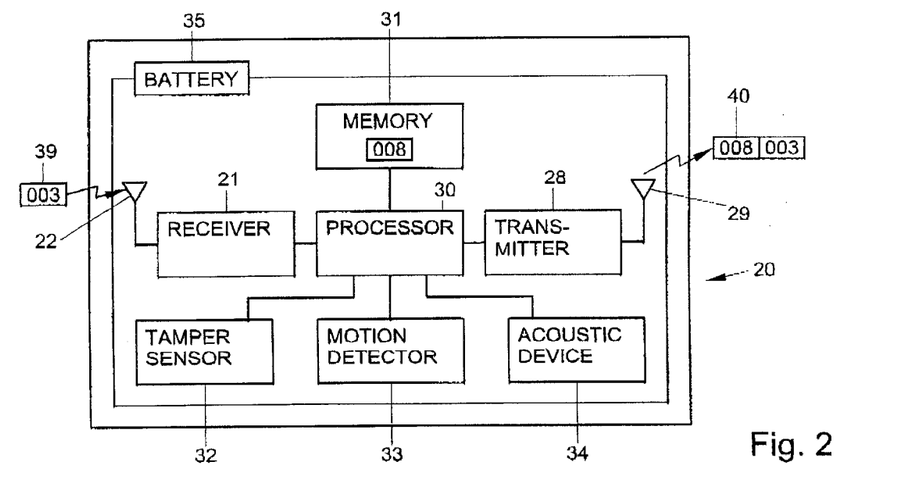
FIG. 2 is a schematic representation of an example of a tag according to the invention.

The tags are further described with reference to FIG. 2. The tag shown in FIG. 2 is a universal tag which can be used for monitoring normally stationary objects, but which can also be used for monitoring normally mobile objects. As is explained below in more detail, if it is not required that tags can be used for monitoring both mobile and stationary items, some of the features of this tag can be dispensed with.

The tag has a receiver 21 with an antenna 22 for receiving the activation signal from one of the transmitter stations 2–6 when in the operating area 23–27 of that transmitter station 2–6 and a transmitter 28 with an antenna 29. The transmitter 28 communicates with the receiver 21 via a data processor 30 for activation of the transmitter 28 to transmit a reaction signal in response to receipt of an activation signal by the receiver 21. The tag further includes a memory 31, preferably in the form of a flash memory, for storing settings of the tag such as its identification code, which memory 31 communicates with the processor 30. The tag further includes a tamper sensor 32 and a motion sensor 33 which also communicate with the data processor 30 and an acoustic device 34 such as a buzzer or a piezo electric beeper connected to the data processor for generating an alarm signal under control of the data processor. Furthermore a battery 35 is provided for feeding the circuit of the tag including the above-described units.

Depending on the object onto which the tag is to be attached, the memory 31 can be programmed differently. If the tag is to be attached to a stationary object, the memory can for example be programmed such that the data processor activates the acoustic device 34 and the transmitter 28 in response to a signal from the motion detector 33 signalling motion of the tag. If the tag is to be attached to an object of which the normal use involves at least occasional movement of that object, the memory 31 can be programmed such that the data processor 30 disregards signals from the motion detector 33 or only to activate the receiver 21 in response to motion from the motion detector 33. The motion detector 33 can also be left out if the tag is to be attached to regularly moved objects only. The acoustic device 34 can also be left out if acoustic alarm is not desired. Conversely, the receiver 21 and the associated antenna 22 can be left out if only movement of the object and tampering with the tag needs to be detected and transmission of a reaction signal in response to presence in one of the, operating areas 23–27 is not required.

The operating areas 23–27 of the transmitter stations 2–6 in which tags 14–20, when located in such an area, are activated to transmit a reaction signal are spatially distributed.

For receiving the reaction signals transmitted by the tags 14–20, a receiver station 36 with an antenna 37 is provided. The receiver station 36 is connected to a network via a network interface unit 37. One of the transmitter stations 6 is also connected to the network interface unit 37. The communication between the network interface unit 37, the receiver 36 and the transmitter 6 can for instance be set up in accordance with the RS(EIA)-485 standard. According to this example, the network to which the network interface unit is connected is a TCP/IP network. Via this network, the network interface unit 37 communicates with a server 38 which forms a data registration structure communicating for registering data representing positions of tags in accordance with the reaction signals received from the receiver station 36. A user interface of the tracing system is formed by a client computer system 39 also connected to the TCP/IP network and allowing access to programs and data of the tracing system for an operator logged in as a user having the required permissions. To such a network typically also other client computers will be connected in which can each provide access to programs and data of the tracing system for an operator logged in as a user having the required permissions, unless the programs of the tracing systems are set to communicate only to one or more selected client computer systems.

The transmitter stations 2–6 are each adapted for including a predetermined transmitter station code in the activation signal. In FIG. 1 exemplary transmitter station codes are each indicated by a three-digit number adjacent the transmitter stations 2–6. The transmitter station codes of the transmitter stations 2–6 are mutually different and mutually distinguishing activation signals from each of the transmitter stations 2–6 from activation signals from the other transmitter stations 2–6. If it is not necessary to distinguish between tags in the operating area of one of the transmitter stations and tags in an operating area of another one of the transmitter stations, it is also possible to provide that two or more of the transmitter stations have the same transmitter station code.

The tags 14–20 are each adapted for receiving transmitter station codes in the received activation signal and for including the transmitter station code of the activation signal that caused the reaction signal to be transmitted in the reaction signal transmitted by that tag 14–20. If for instance, as is shown in FIGS. 1 and 2, an activation signal 39 with the code "003" is received from the transmitter 6 and the tag identity code stored in the memory 31 of the tag is "008", the tag 20 responds by transmitting the reaction signal 40 including the codes "008" and "003". This combination of codes is received by the receiver 36 and communicated via the network interface unit 37 to the server 38.

On the central server 38 a computer program is installed which includes instructions for causing a data registration structure to read reaction signals inputted from the receiver station 36 and to register data representing positions of tags 14–20 in accordance with the inputted reaction signals and instructions for reading transmitter station codes included in the inputted reaction signals and instructions for registering data representing positions of tags 14–20 in accordance with transmitter station codes included in the inputted reaction signals. Thus, in operation, data 41 representing positions of tags 17, 18, 20 in cells 24, 25, 27 are stored in accordance with transmitter station codes received from the tags by the receiver station 36

By accessing these data via the client computer system 39, a user can trace where certain tags have been detected most recently and by maintaining a log of tag detections, movement paths of tags can also be traced.

If it is not required to distinguish between certain objects, for instance because the objects are identical and interchangeable or because it is sufficient to trace certain types of objects, it is also possible to provide that some tags contain and transmit the same tag identity code or even that none of the tags contains and transmits a tag identity code.

If it is not required to distinguish between some of the transmitter stations, it is also possible to provide that some of the transmitters are set to transmit the same transmitter station code. This allows for instance to create elongate or other non-circular cells in which the activation signals are generated by a plurality of transmitter stations transmitting the same transmitter station code.

Settings of the transmitter station codes to be transmitted can for instance be stored in a non-volatile memory in which data can be changed using a personal computer to which the card is temporarily connected.

Since the transmitter station code is included in the reaction signal transmitted by a tag and received by a receiver which can be located outside the operating area of the transmitter station, communication between the transmitter and the central control unit 38 is not necessary. This facilitates installation because the transmitter stations can be installed as stand-alone units, which do not need to be connected to a communication network. Furthermore, this allows monitoring changes in the positions of objects without requiring separate communication between the central control unit 38 and each of the transmitters 2–6. Accordingly, the signals indicating the presence of tags in the operating areas of the transmitter stations, which signals need to be transported with particular urgency to obtain a quick response, do not increase the communication intensity via the network.

In FIG. 1, the border of the operating area is indicated by reference numeral 41. If objects need to be traced in a substantially larger area, it is possible to provide more than one receiver station. However, the positional information regarding the tags is still derived from the transmitter code included in the reaction signals transmitted by the tags when present in one of the cells 23–27.

For stationary objects like the objects 7–9 it can be advantageous to generate early warning signals in response to detection of motion by the motion detector 32 of the tag 14–16 attached to that object. For instance, for costly objects which should not be moved at all, it is important to be warned of any movement thereof as soon as possible. This can for instance be achieved by programming the tags in such a manner, that a reaction signal is also transmitted in response to movement of the tag. Instead of the transmitter station code, the code added to the tag identity code is then preferably a code representing detection of motion by the motion detector 33. The same principle can be applied to detection of tampering by the tamper detector 32. The server is then preferably programmed to cause generation of a warning signal at the client computer system 39 in response to any reaction signal including the motion or tamper code. It is a particular advantage of the shown system that data relating to the detected position and to detected occurrences such as movement and tampering can be received and processed via the same receiver independent of the actual position of the object in the monitored area (in this example the building 1).

Figure 3:
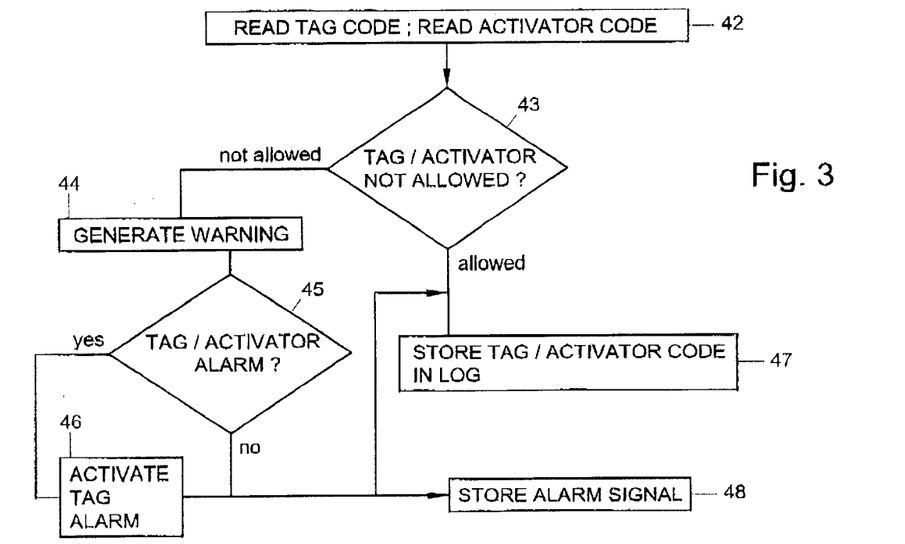
FIG. 3 is an exemplary flow chart of the processing of a reaction signal received from a tag.
Figure 4:
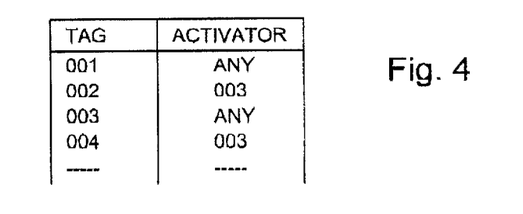
FIG. 4 is a partial representation of a data table of warning conditions.

As is illustrated by FIGS. 3 and 4, generation of warning signals is preferably controlled by comparing the reaction signal received by the receiver station 36 (or at least one of the receiver stations if there are more receiver stations 36) with a predetermined warning condition. To this end, the codes included in the signal are first read (step 42), then the read codes are checked against not allowed combinations (step 43). An example of some not allowed combinations is shown in the table in FIG. 4. According to this table, any reaction signal including tag identity code 001 or 003 causes a warning signal to be generated. The tag identity codes 002 and 004 associated to regularly mobile objects 11, 12 do not cause generation of a warning signal unless combined with front door transmitter station code 003. Accordingly, it is also possible to provide for the generation of warning signals for certain tags of which movement is allowed, but which are not allowed to leave the room or not allowed to enter certain areas (for instance apparatus sensitive to humidity should not be brought into a swimming pool area). If the combination tag and transmitter station codes is not allowed and a warning signal is generated (step 44), it is also checked whether, in addition to a warning signal, an alarm signal should be generated by activating acoustic device 34 (step 45). This can for instance be determined by comparing the received combination of tag code and transmitter station code with another set of data. In the example shown in FIG. 1, such combinations can only include the transmitter station code "003" of the front door transmitter station 6, because this transmitter station 6 is the only transmitter station connected to the central server 38 for receiving commands causing the transmitter station to transmit a signal which activates the acoustic device of any tag in the operating area 27 of that transmitter 6. If the combination of received codes is found to match the data defining the acoustic alarm condition, the central server 38 activates the transmitter 6 to transmit an acoustic alarm command signal and the tag in the operating area of that transmitter 6 is caused to generate an acoustic alarm (step 46), preferably for a minimum duration of time independent of the subsequent location of the tag.

Independent of generation of any warning or alarm signals, any received combination of tag and activator codes is stored in a log (step 47) preferably in combination with time and date. This also applies to any warnings and alarms, which have been generated (step 48).

In order to obtain a quick response to occurrence of a warning or alarm condition, the processing of signals received by receiver station 36 into warning signals and alarm signals is preferably carried out in real-time, i.e. in closely timed relation to the receipt of the respective signals. To achieve this, a continuously active service process interrogating the receiver station 36 or a port connected thereto can be provided.

Control of the tags to generate acoustic or other alarm signals by the central server via a transmitter connected thereto is advantageous, because it allows central control over alarm conditions which should cause tags to generate alarm signals. However, it is also possible to program the tags to determine in response to which conditions alarm signals should be generated by the tag, for instance in response to motion and/or in response to activation signals including pre-selected transmitter station codes. Alternatively, it is also possible to program a stand-alone transmitter station to include alarm instructions including one or more tag identity codes in the activation signal and causing only tags having the same tag identity code or codes to generate an alarm signal when activated in the operating area of that transmitter station.

The system shown in FIG. 1 also includes a number of personal identity tags 49, 50, 51, 52 to be worn by persons in the building 1, which tags may for instance have the same structure as the tag shown in FIG. 2. In accordance with the field of application it may or may not be preferable to include tamper sensors, motion detectors and acoustic alarms in such tags. Thus, the shown system also allows tracing the location of persons.

One particularly advantageous application of such tags is that they allow modifying or suppressing warning signals if a predetermined personal (tag) identity code is determined within a predetermined time period and in combination with the same transmitter station code as the transmitter station code included in the signal matching the warning condition. This allows for instance to distinguish a situation in which an object is carried through an operating area of a transmitter station by a person authorized to do so from a situation in which the same object is carried through the same operating area by a person not authorized to do so.

Furthermore, associating the detection of personal identity codes in an operating area to the detection of tag identity codes in the same operating area within the same limited time frame allows to establish which person was last detected in combination with an object, which may be helpful for finding back the object in the event tracing alone does not lead to this result.

According to the present example, the operating areas 23–27 of the transmitter stations 2–6 are spatially separated from each other. This brings about the advantage that the tags are not activated when they are located in most areas of the building and that the tags are activated only when they are located in some limited areas in the building 1 covered by the transmitter stations. Thus, the tags are activated only when present in selected areas of the building 1, which contributes to reducing energy consumption of the tags and reducing the intensity of communication. Furthermore, the likelihood of disturbance of other similar systems operating independent of the shown system is reduced due to the relatively small operating ranges of the transmitter stations.

Preferably, the transmitter stations send activation signals at a LF frequency of for instance 8.9 kHz and preferably the tags send reaction signals at a frequency in the UHF range, for instance 433 MHz and more preferably, 868 MHz. UHF frequencies higher than 600 to 700 MHz are advantageous because of relatively little sensitivity to disturbance and the possibility of using a relatively small antenna in both the tags and the receiver stations. Smaller antennas are more suitable for integration in housings, which is favourable for counteracting damage and sabotage of the antennas.

That the operating area of the receiver station 36 includes the operating areas 23–27 of a plurality of the transmitter stations 2–6 also enhances the ease of installation of the proposed system, because only a limited number of receiver stations 36 need to be installed. This is particularly advantageous because the receiver stations are to be connected for communication with the central control station. To limit the number of receiver stations 36 and to obtain a relatively low density of operating areas of the transmitter stations 2–6 in which the tags 14–20 are activated, the operating range within which the receiver station 36 is capable of receiving reaction signals from the tags 14–20 is preferably at least three, and more preferably at least four or at least five times as large as the operating range within which the tags 14–20 are activated by the transmitter stations 2–6. Furthermore, the operating range of the transmitter stations is preferably adjustable, for instance from 2–6 meters, to accommodate the operating area to the situation where the passage of objects is to be monitored.

According to the present example, the tagged objects 7–13 are each located in an enclosed area, the enclosure of the area having a passage 53–57 allowing entry and exit of the objects. The operating areas 23–27 of the transmitter stations 2–6 each include one of the passages 53–57. By including a entry and exit passage of an enclosed area in a monitored operating area of a transmitter, tracing of objects in a relatively large area is made possible with reasonable certainty by monitoring only relatively small areas including the entry and exit passage of that area. In conjunction with the present system, this also provides the advantage that the tags are in principle only activated when entering or leaving the enclosed area, so that energy consumption of the tags and communication intensity are further reduced. In turn, the rare activation and relatively low communication intensity allow the use of tags having transmitters with a large operating range without causing too much interfering signals and without undue reduction of battery life.

For quick inventory of missing objects and/or inoperative tags an activation signal receivable by any tag in a monitoring area can be transmitted and, reaction signals received in response to the activation signal can be registered and compared with registered data representing tags in the monitoring area. Then, if data representing tags in the monitoring area are not matched by any of the registered reaction signals, a warning signal is generated indicated that the tag is either missing or inoperative, for instance due to the battery being empty or due to damage to the tag. The signal in the monitoring area can for instance be generated by portable transmitter or by a strong central transmitter.

Within the framework of the present invention many other embodiments than the above-described examples are conceivable. For instance, instead of sending the reaction signals directly to the receiver station or stations, it is also possible to use one or more relay stations for receiving and retransmitting reaction signals to increase the effective operating area of a receiver station.

What is claimed is:

1. A method for tracing objects, comprising:
providing a plurality of distributed transmitter stations, each of said transmitter stations transmitting an activation signal;
attaching a tag to each object to be monitored, each of said tags receiving the activation signal from one of said transmitter stations when in an operating area of said one of said transmitter stations, the received activation signal causing the tag to transmit a reaction signal and the operating areas of said transmitter stations being spatially distributed;
providing at least one receiver station, said receiver station receiving said reaction signals transmitted by said tags; and
registering data representing positions of tags in accordance with said reaction signals received by said at least one receiver station;
wherein the activation signal transmitted by each of said transmitter stations includes a predetermined transmitter station code associated to that transmitter station, the transmitter station codes transmitted by at least two of said transmitter stations being mutually different and distinguishing activation signals from at least one of said transmitter stations from activation signals from at least one other one of said transmitter stations;
said reaction signals transmitted by activated ones of said tags each including the transmitter station code included in the received activation signal that caused the tag to transmit said reaction signal; and
the registration of data representing positions of tags being carried out in accordance with different transmitter station codes received from said tags by said receiver station or each of said receiver stations.

2. A method according to claim 1, wherein, in a monitored area, the transmitter station codes are unique codes each identifying one of said transmitter stations.

3. A method according to claim 1, wherein the or each receiver station has an operating area which includes the operating areas of a plurality of the transmitter stations.

4. A method according to claim 1, further including transmitting an activation signal receivable by any tag in a monitoring area, registering reaction signals received in response to said activation signal, comparing said registered reaction signals with registered data representing tags in said monitoring area and generating a warning signal in response to data representing tags in said monitoring area not matched by any of said registered reaction signals.

5. A method according to claim 1, wherein the or each receiver station has an operating range within which the receiver station is capable of receiving reaction signals from the tags, said operating range being at least three times as large as the operating range of the transmitter stations(2–6) within which the tags are activated by the transmitter stations.

6. A method for tracing objects, comprising:
providing a plurality of distributed transmitter stations, each of said transmitter stations transmitting an activation signal;
attaching a tag to each object to be monitored, each of said tags receiving the activation signal from one of said transmitter stations when in an operating area of said one of said transmitter stations, the received activation signal causing the tag to transmit a reaction signal and the operating areas of said transmitter stations being spatially distributed;
providing at least one receiver station, said receiver station receiving said reaction signals transmitted by said tags; and
registering data representing positions of tags in accordance with said reaction signals received by said at least one receiver station;
wherein the activation signal transmitted by each of said transmitter stations includes a predetermined transmitter station code associated to that transmitter station, the transmitter station codes transmitted by at least two of said transmitter stations being mutually different and distinguishing activation signals from at least one of said transmitter stations from activation signals from at least one other one of said transmitter stations;

said reaction signals transmitted by activated ones of said tags each including the transmitter station code included in the received activation signal that caused the tag to transmit said reaction signal;

the registration of data representing positions of tags being carried out in accordance with transmitter station codes received from said tags by said at least one receiver station; and said receiver station receiving said reaction signals transmitted by said tags located in said operating area of said one of said transmitter stations being located outside said operating area of said transmitter station.

7. A method for tracing objects, comprising:

providing a plurality of distributed transmitter stations, each of said transmitter stations transmitting an activation signal;

attaching a tag to each object to be monitored, each of said tags receiving the activation signal from one of said transmitter stations when in an operating area of said one of said transmitter stations, the received activation signal causing the tag to transmit a reaction signal and the operating areas of said transmitter stations being spatially distributed;

providing at least one receiver station, said receiver station receiving said reaction signals transmitted by said tags; and registering data representing positions of tags in accordance with said reaction signals received by said at least one receiver station;

wherein the activation signal transmitted by each of said transmitter stations includes a predetermined transmitter station code associated to that transmitter station, the transmitter station codes transmitted by at least two of said transmitter stations being mutually different and distinguishing activation signals from at least one of said transmitter stations from activation signals from at least one other one of said transmitter stations;

said reaction signals transmitted by activated ones of said tags each including the transmitter station code included in the received activation signal that caused the tag to transmit said reaction signal;

the registration of data representing positions of tags being carried out in accordance with transmitter station codes received from said tags by said at least one receiver station;

the operating areas of said transmitter stations being spatially separated from each other; and at least one of said objects being located in an enclosed area, the enclosure of said area having at least one passage allowing entry and exit of said objects, the operating areas of said transmitter stations each including at least one of said passages.

8. A method according to claim 7, wherein the operating area of each transmitter station includes at most one of said passages.

9. A method for tracing objects, comprising:

providing a plurality of distributed transmitter stations, each of said transmitter stations transmitting an activation signal;

attaching a tag to each object to be monitored, each of said tags receiving the activation signal from one of said transmitter stations when in an operating area of said one of said transmitter stations, the received activation signal causing the tag to transmit a reaction signal and the operating areas of said transmitter stations being spatially distributed;

providing at least one personal tag carried by a person, the or each personal tag receiving the activation signal from one of said transmitter stations being activated to transmit a reaction signal when in an operating area of said one of said transmitter stations;

providing at least one receiver station, said receiver station receiving said reaction signals transmitted by said tags; and registering data representing positions of tags in accordance with said reaction signals received by said at least one receiver station;

wherein the activation signal transmitted by each of said transmitter stations includes a predetermined transmitter station code associated to that transmitter station, the transmitter station codes transmitted by at least two of said transmitter stations being mutually different and distinguishing activation signals from at least one of said transmitter stations from activation signals from at least one other one of said transmitter stations;

said reaction signals transmitted by activated ones of said tags each including the transmitter station code included in the received activation signal that caused the tag to transmit said reaction signal;

the registration of data representing positions of tags being carried out in accordance with transmitter station codes received from said tags by said at least one receiver station; and a warning signal being generated if the reaction signal received by said at least one receiver station matches a predetermined warning condition;

wherein, in response to receipt within a common period of time of a reaction signal matching a warning condition and a reaction signal including a predetermined personal tag code and the same transmitter station code as the transmitter station code in the reaction signal matching the warning condition, said warning signal is not generated or generated in modified form.

10. A method for tracing objects, comprising:

providing a plurality of distributed transmitter stations, each of said transmitter stations transmitting an activation signal;

attaching a tag to each object to be monitored, each of said tags receiving the activation signal from one of said transmitter stations when in an operating area of said one of said transmitter stations, the received activation signal causing the tag to transmit a reaction signal, at least one protected one of said tags further including a motion and/or tamper detector, said protected tag being adapted for transmitting a reaction signal including a warning code in reaction to motion and/or tampering of the tag detected by said motion and/or tamper detector, the operating areas of said transmitter stations being spatially distributed;

providing at least one receiver station, said receiver station receiving said reaction signals transmitted by said tags; and registering data representing positions of tags in accordance with said reaction signals received by said at least one receiver station;

wherein the activation signal transmitted by each of said transmitter stations includes a predetermined transmitter station code associated to that transmitter station, the transmitter station codes transmitted by at least two of said transmitter stations being mutually different and distinguishing activation signals from at least one of said transmitter stations from activation signals from at least one other one of said transmitter stations;

said reaction signals transmitted by activated ones of said tags each including the transmitter station code included in the received activation signal that caused the tag to transmit said reaction signal;

the registration of data representing positions of tags is carried out in accordance with transmitter station codes received from said tags by said at least one receiver station; and a warning signal being generated in response to a reaction signal including said warning code.

11. A system for tracing objects, comprising:

a plurality of distributed transmitter stations for transmitting activation signals;

a plurality of tags for attachment to objects to be monitored, each of said tags including a receiver for receiving the activation signal from one of said transmitter stations when in the operating area of said one of said transmitter stations and a transmitter communicating with the receiver for activation of the transmitter to transmit a reaction signal in response to receipt of an activation signal by the receiver, the operating areas of said transmitter stations being spatially distributed;

at least one receiver station for receiving said reaction signals transmitted by said tags; and a data registration structure communicating with said at least one receiver station for registering data representing positions of tags in accordance with said reaction signals received by said at least one receiver station;

wherein said transmitter stations are each adapted for including a predetermined transmitter station code in the activation signal, the transmitter station codes of at least two of said transmitter stations being mutually different and mutually distinguishing activation signals from at least one of said transmitter stations from activation signals from at least one other one of said transmitter stations;

said tags each being adapted for receiving transmitter station codes in the received activation signal and for including the transmitter station code of the activation signal that caused the reaction signal to be transmitted in the reaction signal transmitted by that tag; and said data registration structure being adapted for registration of data representing different positions of activated ones of tags in accordance with different transmitter station codes received from said tags by said receiver station or each of said receiver stations.

12. A system according to claim 11, wherein each of said transmitter stations in a monitored area is adapted for transmitting a different transmitter station code identifying the transmitter station.

13. A system for tracing objects, comprising:

a plurality of distributed transmitter stations for transmitting activation signals;

a plurality of tags for attachment to objects to be monitored, each of said tags including a receiver for receiving the activation signal from one of said transmitter stations when in the operating area of said one of said transmitter stations and a transmitter communicating with the receiver for activation of the transmitter to transmit a reaction signal in response to receipt of an activation signal by the receiver, the operating areas of said transmitter stations being spatially distributed;

at least one receiver station for receiving said reaction signals transmitted by said tags; and a data registration structure communicating with said at least one receiver station for registering data representing positions of tags in accordance with said reaction signals received by said at least one receiver station;

wherein said transmitter stations are each adapted for including a predetermined transmitter station code in the activation signal, the transmitter station codes of at least two of said transmitter stations being mutually different and mutually distinguishing activation signals from at least one of said transmitter stations from activation signals from at least one other one of said transmitter stations;

said tags each being adapted for receiving transmitter station codes in the received activation signal and for including the transmitter station code of the activation signal that caused the reaction signal to be transmitted in the reaction signal transmitted by that tag; and said data registration structure being adapted for registration of data representing positions of tags in accordance with transmitter station codes received from said tags by said at least one receiver station, further including at least one tag including a motion and/or tamper detector and a control member communicating with the motion and/or tamper detector and for activating the transmitter for transmitting a reaction signal in reaction to at least motion or tampering of the tag detected by said motion and/or tamper detector.

14. A system for tracing objects, comprising:

a plurality of distributed transmitter stations for transmitting activation signals;

a plurality of tags for attachment to objects to be monitored, each of said tags including a receiver for receiving the activation signal from one of said transmitter stations when in the operating area of said one of said transmitter stations and a transmitter communicating with the receiver for activation of the transmitter to transmit a reaction signal in response to receipt of an activation signal by the receiver, the operating areas of said transmitter stations being spatially distributed;

at least one receiver station for receiving said reaction signals transmitted by said tags; and a data registration structure communicating with said at least one receiver station for registering data representing positions of tags in accordance with said reaction signals received by said at least one receiver station;

wherein said transmitter stations are each adapted for including a predetermined transmitter station code in the activation signal, the transmitter station codes of at least two of said transmitter stations being mutually different and mutually distinguishing activation signals from at least one of said transmitter stations from activation signals from at least one other one of said transmitter stations;

said tags each being adapted for receiving transmitter station codes in the received activation signal and for including the transmitter station code of the activation signal that caused the reaction signal to be transmitted in the reaction signal transmitted by that tag;

said data registration structure being adapted for registration of data representing positions of tags in accordance with transmitter station codes received from said tags by said at least one receiver station;

wherein said receiver for receiving said reaction signals transmitted by said tags located in said operating area of said one of said transmitter stations is located outside said operating area of said transmitter station.

15. A system according to claim 14, wherein the or each receiver station has an operating area which includes the operating areas of a plurality of the transmitter stations.

16. A system according to claim 14, wherein the or each receiver station has an operating range within which the receiver station is capable of receiving reaction signals from the tags, said operating range being at least three times as large as the operating range of the transmitter stations(2–6) within which the tags are activated by the transmitter stations.

17. A system according to claim 15, wherein the or each receiver station has an operating range within which the receiver station is capable of receiving reaction signals from the tags, said operating range being at least three times as large as the operating range of the transmitter stations(2–6) within which the tags are activated by the transmitter stations.

18. A system for tracing objects, comprising:
- a plurality of distributed transmitter stations for transmitting activation signals;
- a plurality of tags for attachment to objects to be monitored, each of said tags including a receiver for receiving the activation signal from one of said transmitter stations when in the operating area of said one of said transmitter stations and a transmitter communicating with the receiver for activation of the transmitter to transmit a reaction signal in response to receipt of an activation signal by the receiver, the operating areas of said transmitter stations being spatially distributed;
- at least one receiver station for receiving said reaction signals transmitted by said tags; and
- a data registration structure communicating with said at least one receiver station for registering data representing positions of tags in accordance with said reaction signals received by said at least one receiver station;
- wherein said transmitter stations are each adapted for including a predetermined transmitter station code in the activation signal, the transmitter station codes of at least two of said transmitter stations being mutually different and mutually distinguishing activation signals from at least one of said transmitter stations from activation signals from at least one other one of said transmitter stations;
- said tags are each adapted for receiving transmitter station codes in the received activation signal and for including the transmitter station code of the activation signal that caused the reaction signal to be transmitted in the reaction signal transmitted by that tag; and
- said data registration structure is adapted for registration of data representing positions of tags in accordance with transmitter station codes received from said tags by said at least one receiver station;
- the operating areas of said transmitter stations are spatially separated from each other; and
- at least one of said objects is located in an enclosed area, the enclosure of said area having at least one passage allowing entry and exit of said objects, the operating areas of said transmitter stations each including at least one of said passages.

19. A computer program for use in a system for tracing objects, comprising
- instructions for causing a data registration structure to read reaction signals inputted from a receiver station and to register data representing positions of tags in accordance with said inputted reaction signals;
- instructions for reading transmitter station codes included in said inputted reaction signals and instructions for registering data representing positions of tags in accordance with transmitter station codes included in said inputted reaction signals;
- instructions for comparing inputted reaction signals with a predetermined warning condition, instructions for generating a warning signal if the inputted reaction signal matches the predetermined warning condition, and instructions for causing said comparing and generating instructions to be carried out in real-time;
- instructions for registering data representing positions of personal tags in accordance with inputted reaction signals including the transmitter station code included in the received activation signal that caused the reaction signal to be transmitted;
- instructions for combining said data representing positions of personal tags with data representing positions of tags that have been received by the receiver station in a common period of time; and
- instructions causing said warning signal not to be generated or to be generated in modified form in response to data representing a combination of a reaction signal matching a warning condition and a reaction signal including a predetermined personal tag code and including the same transmitter station code as the transmitter station code included in the reaction code matching the warning condition.

* * * * *